United States Patent [19]
Nguyen et al.

[11] Patent Number: 5,515,511
[45] Date of Patent: May 7, 1996

[54] HYBRID DIGITAL/ANALOG MULTIMEDIA HUB WITH DYNAMICALLY ALLOCATED/RELEASED CHANNELS FOR VIDEO PROCESSING AND DISTRIBUTION

[75] Inventors: Tam M. Nguyen, Valhalla; Deepak Rana; Antonio Ruiz, both of Yorktown Heights; Barry E. Willner, Briarcliff Manor, all of N.Y.

[73] Assignee: International Business Machines Corporation, Armonk, N.Y.

[21] Appl. No.: 254,201

[22] Filed: Jun. 6, 1994

[51] Int. Cl.$^6$ .......................................... H04J 3/17
[52] U.S. Cl. ...................... 395/200.2; 370/85.7; 370/95.1
[58] Field of Search ........................... 395/200, 200.2; 348/7, 572, 578; 370/73, 85.4, 85.5, 95.1, 85.7

[56] References Cited

U.S. PATENT DOCUMENTS

| | | | |
|---|---|---|---|
| 4,935,924 | 6/1990 | Baxter | 370/73 |
| 5,195,092 | 3/1993 | Wilson et al. | 370/94.2 |
| 5,289,461 | 2/1994 | De Nijs | 370/58.1 |
| 5,325,423 | 6/1994 | Lewis | 379/90 |
| 5,371,551 | 12/1994 | Logan et al. | 348/571 |
| 5,374,952 | 12/1994 | Flohr | 348/12 |
| 5,388,097 | 2/1995 | Baugher et al. | 370/85.5 |
| 5,408,469 | 4/1995 | Opher et al. | 370/60.1 |
| 5,412,720 | 5/1995 | Hoarty | 380/15 |
| 5,422,883 | 6/1995 | Hauris et al. | 370/62 |

*Primary Examiner*—Krisna Lim
*Attorney, Agent, or Firm*—Whitham, Curtis, Whitham & McGinn; Douglas W. Cameron

[57] ABSTRACT

A multimedia distribution network combines the flexibility of digital video and digital networks with the low cost, high bandwidth, and isochronous capabilities of analog video distribution. At the heart of the network is a hybrid digital/analog multimedia hub, called a C-box, which provides connectivity to digital networks, both local area and wide area, with the necessary video compression and decompression, composition engines for multiple video streams and analog/digital conversions of the multiple video streams for connectivity to an analog video distribution network for delivery to end user workstations. The C-box receives multiple compressed digital video streams, decompresses the video streams, converts the decompressed video streams to analog, and delivers the converted analog signals to workstations via an analog cable television (CATV) network. The amount of video processing (e.g., compression and decompression) power required is proportional to the number of active video streams instead of the number of attached end user workstations. The analog channels over which the converted analog signals are transmitted are dynamically allocated, and once the analog signals have been transmitted to a requesting client terminal, the channels are released for reuse.

15 Claims, 6 Drawing Sheets

HYBRID DIGITAL/ANALOG MULTIMEDIA HUB WITH DYNAMICALLY ALLOCATED/RELEASED CHANNELS FOR VIDEO PROCESSING AND DISTRIBUTION

BACKGROUND OF THE INVENTION

1. Field of the Invention

The present invention generally relates to the distribution of video signals in a multimedia network and, more particularly, to a low cost, high performance hybrid digital/analog multimedia distribution network which combines the flexibility of digital video and digital networks with the low cost, high bandwidth, and isochronous capabilities of analog video distribution 12. Description of the Prior Art An all digital network for digital video transmission is either too expensive or too slow to support a large number of video streams. An all analog network, on the other hand, lacks the user interactivity possible with digital video in multimedia applications. Existing local area networks (LANs), such as the 10 Mbps (megabits per second) Ethernet or the 16 Mbps Token Ring, have neither the high bandwidth nor the isochronous transfer capability needed to deliver digital video (and audio) to a large number of workstation clients. Current video compression standards, such as those promulgated by the Moving Pictures Experts Group (MPEG) and the Joint Photographic Experts Group (JPEG) at 30 frames/second, typically require a bandwidth of 1.2 Mbps to 4 Mbps for a bit stream of video cassette recorder (VCR) quality video. Higher speed LANs, such as the 100 Mbps Fiber Distributed Data Interface (FDDI) and the newer FDDI-II and gigabit LANs, are not widely available because they are not yet adopted standards and/or are too expensive. As a result of these limitations, most multimedia applications today are done in standalone workstations and only a few concurrent users can be adequately supported in a network environment.

SUMMARY OF THE INVENTION

It is therefore an object of the present invention to provide a multimedia distribution network which combines the flexibility of digital video and digital networks with the low cost, high bandwidth, and isochronous capabilities of analog video distribution.

It is another, more specific object of the invention to provide a hybrid digital/analog multimedia hub which provides connectivity to digital networks, both local area and wide area, with the necessary video compression and decompression, composition engines for multiple video streams and analog/digital conversions of the multiple video streams for connectivity to an analog video distribution network for delivery to end user workstations.

According to the invention, there is provided a low cost and high performance solution for video distribution by connecting high-speed digital networks to analog video distribution systems. The invention is implemented in a hybrid digital/analog multimedia hub, called a C-box. The C-box receives multiple compressed digital video streams, decompresses the video streams, converts the decompressed video streams to analog, and delivers the converted analog signals to workstations via an analog cable television (CATV) network. The analog channels over which the converted analog signals are transmitted are dynamically allocated, and once the analog signals have been transmitted to a requesting client terminal, the channels are released for reuse.

The invention provides a low cost alternative to expensive high-speed all digital networks. Cost saving is achieved in part by using shared video processing resources. The amount of video processing (e.g., compression and decompression) power required is proportional to the number of active video streams instead of the number of attached end user workstations.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
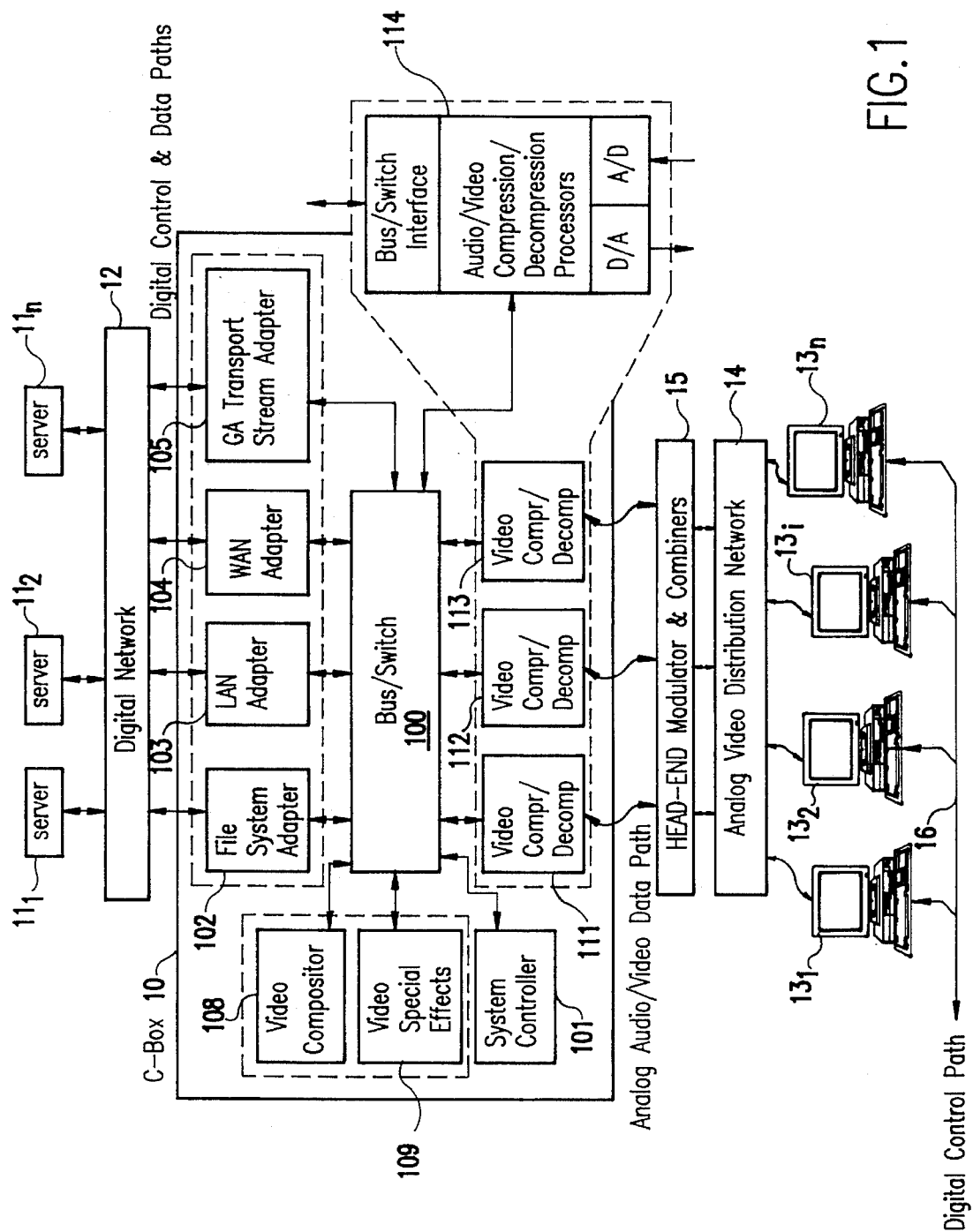
FIG. 1 is a block diagram showing the architecture of the hybrid digital/analog multimedia hub according to the invention.

Referring now to the drawings, and more particularly to FIG. 1, there is shown the architecture of the hybrid digital/analog multimedia hub 10, called the C-box. The C-box 10 may be implemented in an IBM PS/2 model 57SLC or 95 or similar personal computer (PC). A high speed bus 100, such as IBM's Microchannel Bus or the Extended Industry Standard Architecture (EISA) bus, is at the center of the C-box 10. The bus 100 provides connectivity among various internal components, including the adapters that interface with the digital control and data paths and the analog video/audio signal paths. The bus 100 provides sufficient bandwidth to handle the data flows among the components which are attached to it. The personal computer which comprises the C-box 10 includes a central processing unit (CPU) and supporting memory, here generally indicated as the system controller 101, attached to the bus 100. The system controller 101 is the software/hardware control mechanism for allocating analog frequencies for the transmission of video for the network of the analog display stations, for allocating the video processors, and for allocating requests for video materials. There are three types of adapters used in this architecture; file system and digital network adapters 102 to 105, video compression/decompression and analog video network adapters 111 to 114, and video compositor 108 and special effects units 109.

The file system adapter 102 may be a small computer system interface (SCSI) adapter or an Integrated Device Electronics (IDE) adapter, both commonly used in personal computers for supporting various peripheral devices such as hard drives. The LAN adapter 103 may be a Token Ring or Ethernet adapter. The wide area network (WAN) adapter 104 may be a T1/T3 long distance adapter or an asynchronous transaction manager (ATM) adapter. The GA transport stream adapter 105 may be ATM or CATV specific. The file system adapter 102 and digital network adapters, including LAN adapter 103 and WAN adapter 104, provide high-speed digital connections to file servers $11_1$ to $11_n$, via a digital network 12, as well as other C-boxes. These connections may be point-to-point serial or parallel connections, LANs, or long distance communications. Typically, the digital network 12 is used to transfer compressed video as well as other digital data and control information. The digital network 12 should have sufficient bandwidth for a large number of concurrent video streams. Low speed LANs, such as Ethernet or Token Ring, may also be used to transfer control information (or a few video streams) from file servers or the end user workstations.

Figure 2:
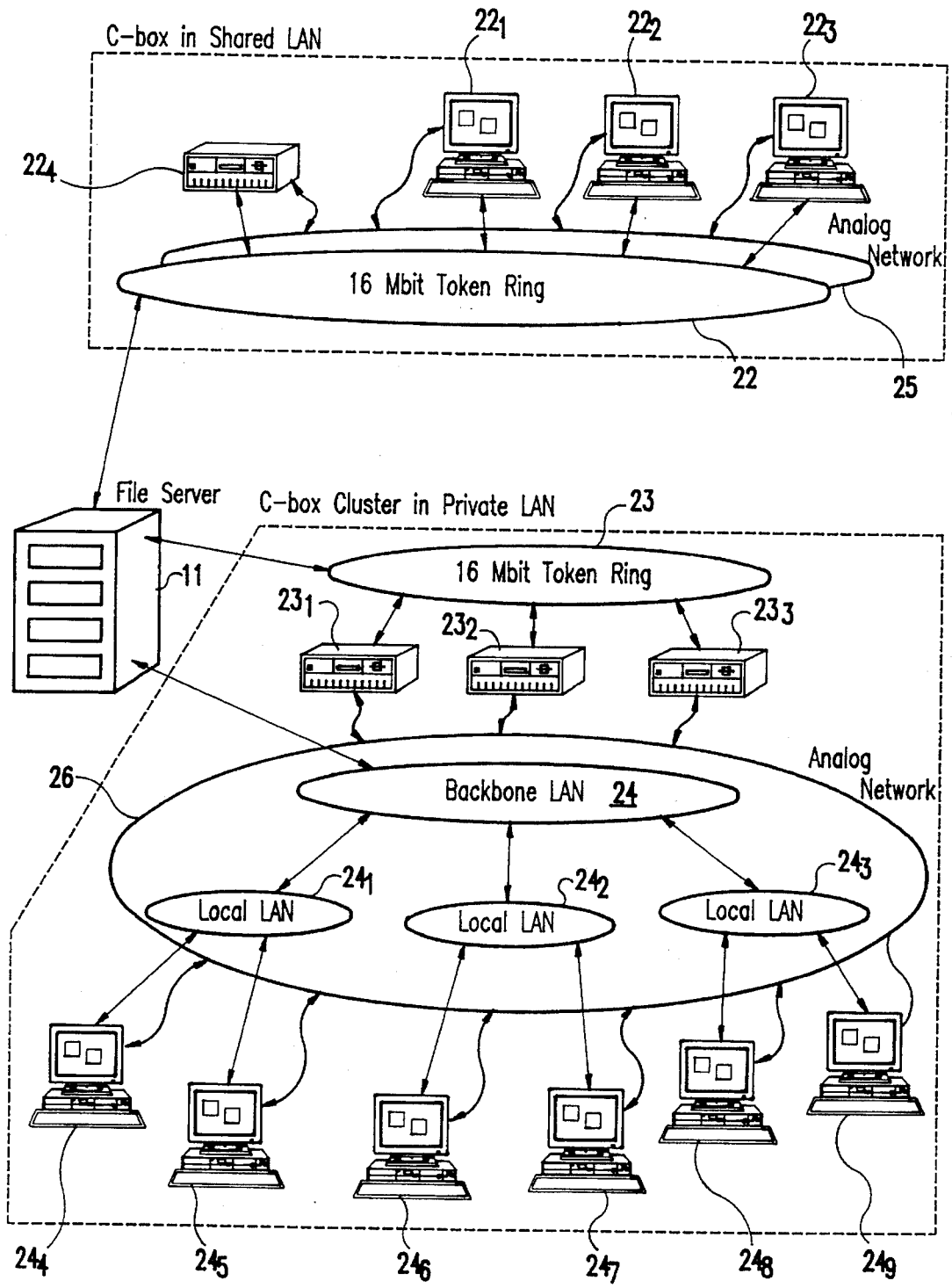
FIG. 2 is a block diagram illustrating a digital network to which the hub of FIG. 1 may be attached.

FIG. 2 shows in example of the digital network 12. One or more file servers 11 may be attached to a plurality of LANs 22, 23 and 24. In the case of LAN 22, a 16 Mbit token ring network is assumed, and to this LAN are connected a plurality of workstations $22_1$, $22_2$ and $22_3$. These workstations are also connected to an analog network 25, and a hub or C-box $22_4$, of the type shown in FIG. 1, is attached between the LAN 22 and the analog network 25. Thus, the hub $22_4$ in this configuration is in a shared LAN. In the case of the LANs 23 and 24, there are a plurality of C-boxes $23_1$, $23_2$ and $23_3$ connected to the LAN 23 which, like LAN 22 may be a 16 Mbit token ring network. These hubs are also connected to an analog network 26. The LAN 24 is assumed in this example to be a backbone LAN to which local LANs $24_1$, $24_2$ and $24_3$ are attached. Each of these local LANs has attached a pair of work stations, $24_4$, $24_5$ and $24_6$, $24_7$ and $24_8$, $24_9$, respectively, and each of the work stations is attached to the analog network 26. Thus, it will be understood that the architecture of the digital network 12 may vary, depending on the specific installation, and that there is considerable flexibility in the architecture.

Returning to FIG. 1, the video compression/decompression and analog video network adapters 111 to 114 implement the Digital Video Interactive (DVI) standard developed by Radio Corporation of America (RCA) and Intel. Each adapter typically receives a compressed video (and audio) stream from the bus 100, decompresses the stream, converts the digital image (and sound) into analog, and delivers this analog stream to an end user workstation $13_1$ to $13_n$ via an analog video distribution network 14 connected to a CATV headend 15. The adapter may also receive from the CATV headend 15 an input analog video stream for digitizing, compressing, and saving to a file server, in a client-server network, or delivering to another video adapter, in a peer-to-peer network. A preferred video compression/decompression and analog video network adapter is IBM's Action Media II adapter with capture option; however, other similar adapters may be used. The workstations $13_1$ to $13_n$ are also connected to the digital network 12 via a digital path 16 to transmit requests for video materials, including the specification of the material and any video processing to be performed. These requests may be through the keyboard of the workstation or via a pointing device such as a mouse.

Figure 3:
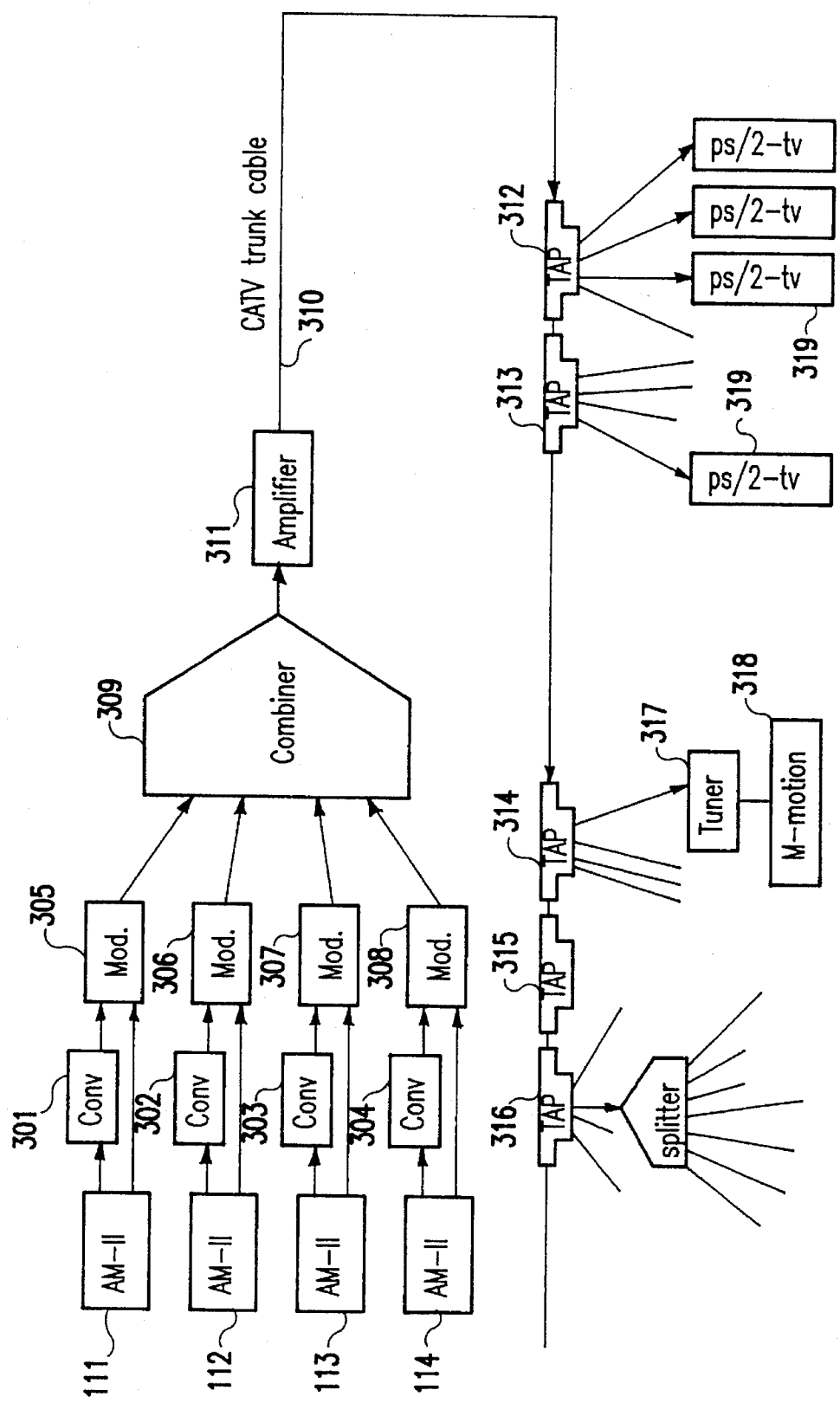
FIG. 3 is a block diagram illustrating a CATV analog broadband network to which the hub of FIG. 1 is connected.

The analog video distribution network 14 and CATV headend 15 may contain a combination of analog switches, tuners, modulators, combiners, splitters, and amplifiers for either baseband or RF (CATV) signals. An example of the analog video distribution network is shown in FIG. 3, to which reference is now made. The adapters 111 to 114 provide an S-video output which must be converted to a composite video format, and this is accomplished with the converters 301 to 304. Each of these converters is connected to a respective modulator 305 to 308 which modulates the baseband composite video and audio into a specified CATV channel. The combiner 309 combines the multiple input signals into one output signal covering the entire range of input frequencies. The output of the combiner 309 is supplied to a single trunk cable 310 that carries all the CATV channels. The trunk cable 310 includes various amplifiers 311 and taps 312 to 316. The taps split an input signal into multiple output signals. The analog video/audio signals from the taps may be displayed on an ordinary TV receiver or on workstation monitors with the appropriate adapter for displaying an analog video signal. In the computer desktop environment, an analog client has the capability to merge an analog video signal with the monitor display. This requires a tuner 317 and an adapter 318, such as International Business Machines (IBM) Corporation's M-Motion adapter. Alternatively, IBM's PS/2-TV adapter 319 may be used.

Returning again to FIG. 1, the video compositor 108 combines the multiple digital video streams into one stream. It is preferable for the composition to occur in the compressed video domain. The special effects unit 109 provides hardware support for the various image processing operations and may be, for example, the Video Toaster from NewTek. Video compositor or special effect units may be integrated with the video decompression unit to minimize latency.

Figure 4:
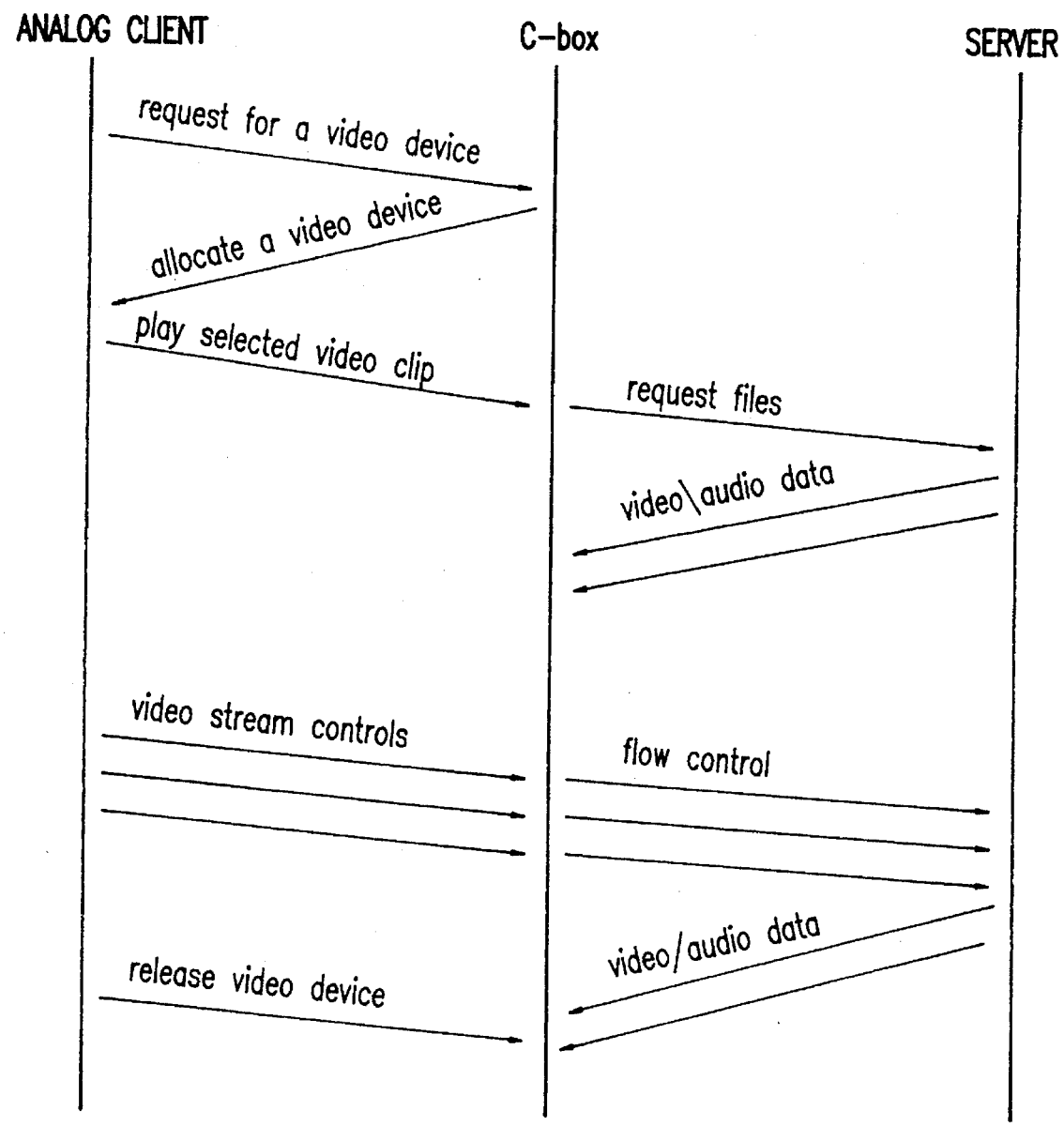
FIG. 4 is a message flow diagram illustrating the control protocol of the system using the hub shown in FIG. 1.

FIG. 4 shows a sample flow control of the system using the C-box. Starting with the analog client, a request is made to the C-box for a video device. The client may request either a type of video device (such as DVI or MPEG) or a video clip which requires a certain type of video device. The C-box allocates a video device, allowing the analog client to play a selected video clip. Once the video device has been assigned, the analog client can select a video clip to be played, if not previously specified, and has full control of the video stream; e.g., play, record, pause, stop, rewind, fast forward, etc. The exact video steam control depends on the capabilities of the particular video device. The C-box requests files from the server, and in response to this request, the server supplies to the C-box video/audio data. Video stream controls flow from the analog client to the C-box, and in response to the video steam control commands from the client, the C-box issues flow control signals to the server to read/write video data to suspend the data flow. The server continues to supply video/audio data until the analog client releases the video device.

The software within the C-box has two major components, the resource manager and the video player. There is one resource manager process for the C-box, but there are multiple video player processes, one for each video adapter device. The resource manager and the video player processes are created during initialization of the C-box.

Figure 5:
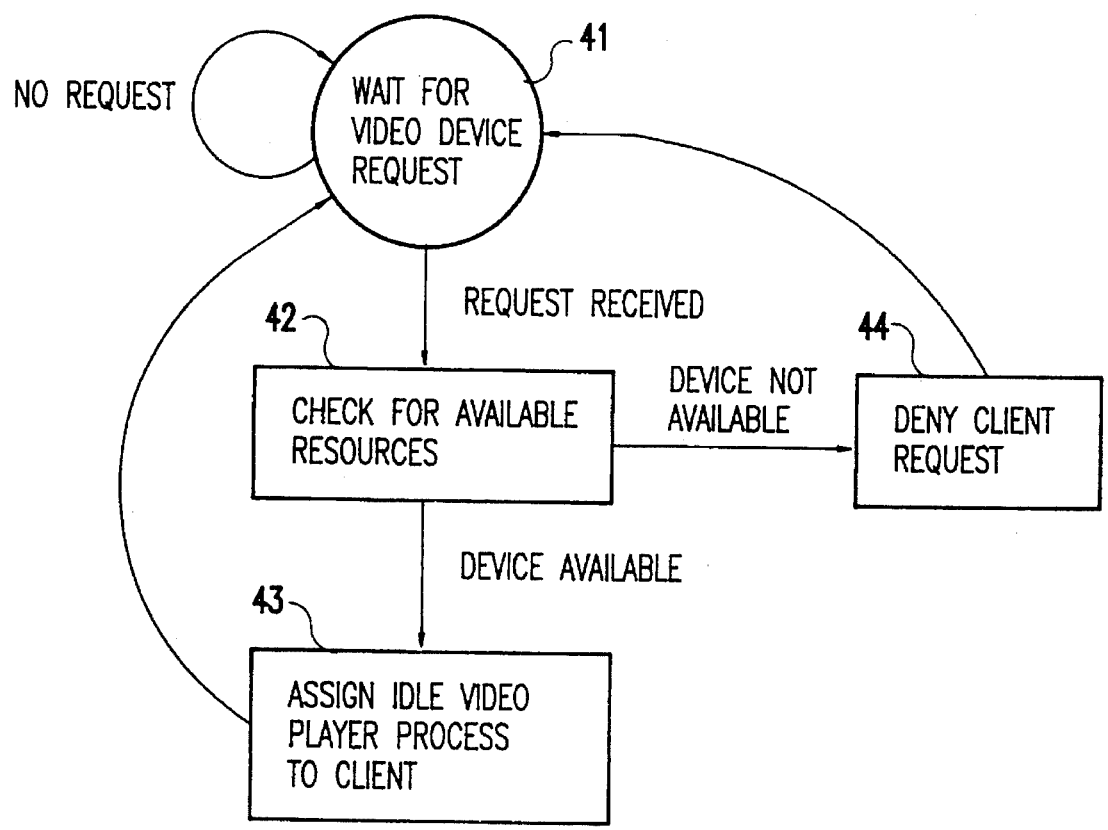
FIG. 5 is a state diagram showing the logic of the resource manager software implemented in the hub shown in FIG. 1.

The resource manager oversees all video devices within the C-box, keeping track of their states; i.e., idle, busy or inoperational. The state diagram of FIG. 5 shows the logic of the resource manager implemented on the C-box. The resource manager is initially in an idle state 41 waiting for an analog client. With reference to FIG. 4, this is the state prior to receiving a request for a video device. When a request is received from an analog client, the resource manager checks for available resources at block 42. If a device is available, the video device is assigned to the requesting analog client at block 43 (in FIG. 4, allocate a video device) and then returns to the idle state 41; otherwise, if a device is not available, the client request is denied at block 44, and the resource manager returns to the idle state 41.

Figure 6:
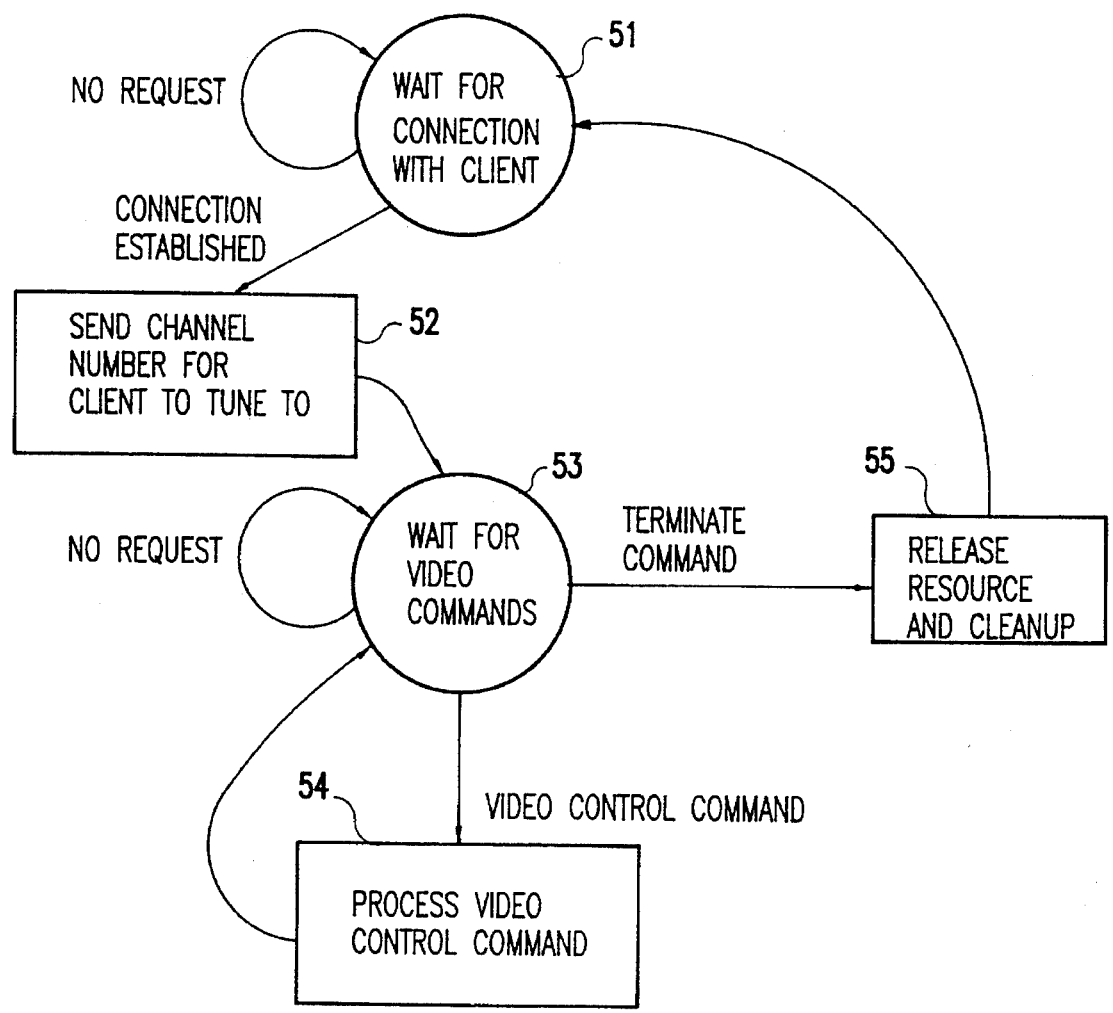
FIG. 6 is a state diagram showing the logic of the video player process software implemented in the hub shown in FIG. 1.

Each video player process is associated with a video player device. It controls the video adapter device for video playback or recording. The state diagram of FIG. 6 shows the logic of the video player process software implemented on the C-box. The process is initially in an idle state 51 waiting for a connection with an analog client. When a connection is established, a channel number to tune to is sent to the client at block 52. With reference to FIG. 4, this is the allocation of a video device. The process then enters an idle state 53 waiting for a video file to be played and subsequent video commands. In FIG. 4, this is either play selected video clip or video stream controls. When a video control command is received, the command is processed at block 54, and the process returns to the idle state 53. When a terminate command is received (in FIG. 4, release video device), the resources are released and housekeeping routines are called at block 55 before the process returns to the idle state 51.

Thus, the invention provides a low cost alternative to expensive high-speed all digital networks. The C-box, which is at the heart of the invention, receives an analog client terminal request transmitted via the digital network for video information services. In response to this request, the C-box dynamically selects an available analog channel or frequency from a pool of analog frequencies for transmission of the requested video information services. If an analog frequency is not available at the time of the request, the request is denied, and the requesting terminal can try again later. When an analog frequency is available, the requesting terminal is notified via the digital network of the selected frequency so that the requesting terminal may tune, either automatically or manually, to the selected frequency. The C-box then waits for an acknowledgement from the requesting terminal before proceeding or, optionally, the C-box proceeds with further processing after a predetermined period of time has elapsed. The C-box retrieves the requested video information services as compressed video digital data from the server and then decompresses and converts the requested video information to analog signals. The converted analog signals are transmitted on the selected analog frequency to the requesting analog client terminal via the analog video distribution network and, after transmitting the converted analog signals, the analog frequency is released to the pool of analog frequencies for use in transmitting other video information frequency requests.

While the invention has been described in terms of a single preferred embodiment, those skilled in the art will recognize that the invention can be practiced with modification within the spirit and scope of the appended claims.

What is claimed is:

1. A method of sharing video/audio processing resources in a multimedia video distribution system in which at least one server storing compressed video digital data is connected to a digital network and a plurality of client terminals are directly connected to the digital network and to an analog video distribution network and a hybrid hub interconnects the digital network and the analog video distribution network, the method being performed by a programmed system controller in said hybrid hub and comprising the steps of:

receiving a client terminal request transmitted via the digital network for video information services;

dynamically selecting an available analog frequency from a pool of analog frequencies for transmission of the requested video information services;

retrieving the requested video information services as compressed video digital data from the server and decompressing and converting to analog signals the retrieved compressed video digital data;

transmitting the requested video information services on the selected analog frequency as the decompressed and converted analog signals to the requesting analog client terminal via the analog video distribution network; and after transmitting the requested video information services, releasing the analog frequency to the pool of analog frequencies for use in transmitting other video information frequency requests.

2. The method of sharing video/audio processing resources in a multimedia video distribution system recited in claim 1 wherein when a an analog frequency is not available from said pool of analog frequencies, further comprising the step of denying the client terminal request via said digital network.

3. The method of sharing video/audio processing resources in a multimedia video distribution system recited in claim 1 further comprising the steps of:

transmitting to the requesting client terminal an identification of the selected analog frequency; and waiting for an acknowledgement from requesting analog client terminal before transmitting the requested video information services.

4. A hybrid digital/analog hub for distribution of video signals in a multimedia network comprising:

a bus for passing digital data among attached adapters;

one or more digital adapters attached to the bus for connection to a digital network including at least one server in which compressed digital video data is stored;

a plurality of video compression/decompression and analog video network adapters connected to the bus and for connection to an analog video distribution network to which are attached a plurality of client terminals, the analog client terminals also being attached to the digital network; and a system controller connected to the bus, said system controller comprising a central processing unit and supporting memory and including software and hardware for controlling devices connected to adapters attached to the bus, said system controller being programmed to dynamically allocate analog frequencies for delivery of on-demand information to the analog client terminals, retrieve compressed video data from the server for decompression and conversion to analog signals by a video compression/decompression and analog video network adapter, and transmitting the converted analog signals to requesting analog client terminals.

5. The hybrid digital/analog hub for distribution of video signals in a multimedia network recited in claim 4 further comprising a video compositor connected to the bus and controlled by the system controller for composing multiple video streams retrieved from the server into one before transmission to a requesting analog client terminal.

6. The hybrid digital/analog hub for distribution of video signals in a multimedia network recited in claim 4 further comprising a video special effects adapter connected to the bus and controlled by the system controller for performing special effects processing on a video stream retrieved form the server before transmission to a requesting analog client terminal.

7. The hybrid digital/analog hub recited in claim 4 wherein the hub is implemented in a personal computer wherein the bus is a high speed bus of the personal computer, each of said digital adapters and video compression/decompression and analog video network adapters are connected to the high speed bus of the personal computer, and said central processing unit and supporting memory are the central processing unit and memory of the personal computer.

8. The hybrid digital/analog hub recited in claim 7 wherein said client terminals are workstations connected to said analog distribution network, said workstations being connected to said digital network via a digital path to transmit requests for video materials, including a specification of the material and any video processing to be performed, said requests for video materials being made by a user of a workstation through a keyboard of the workstation or via a pointing device at the workstation.

9. A high performance hybrid digital/analog multimedia distribution network comprising:

at least one server storing compressed video data;
   a digital network connected to the server;
   an analog video distribution network;
   a plurality of client terminals directly connected to said analog video distribution network and to said digital network; and
   a hybrid hub including
      a bus for passing digital data among attached adapters,
      one or more digital adapters attached to the bus and to the digital network,
      a plurality of video compression/decompression and analog video network adapters connected to the bus and to the analog video distribution network, and
      a system controller connected to the bus, said system controller comprising a central processing unit and supporting memory and including software and hardware for controlling devices connected to adapters attached to the bus, said system controller being programmed to dynamically allocate analog frequencies for delivery of on-demand information to the analog client terminals, retrieve compressed video data from the server for decompression and conversion to analog signals by a video compression/decompression and analog video network adapter, and transmitting the converted analog signals to requesting analog client terminals.

10. The high performance hybrid digital/analog multimedia distribution network recited in claim 9 wherein said system controller is further programmed to deny the client terminal request via said digital network when a an analog frequency is not available from a pool of analog frequencies.

11. The high performance hybrid digital/analog multimedia distribution network recited in claim 9 wherein said system controller is further programmed to transmit to the requesting client terminal an identification of a selected analog frequency, and to wait for an acknowledgement from the requesting client terminal before transmitting the converted analog signals.

12. The high performance hybrid digital/analog multimedia distribution network recited in claim 9 wherein said hybrid hub further comprises a video compositor connected to the bus and controlled by the system controller for composing multiple video streams retrieved from the server into one before transmission to a requesting client terminal.

13. The high performance hybrid digital/analog multimedia distribution network recited in claim 9 wherein said hybrid hub further comprises a video special effects adapter connected to the bus and controlled by the system controller for performing special effects processing on a video stream retrieved form the server before transmission to a requesting client terminal.

14. The high performance hybrid digital/analog multimedia distribution network recited in claim 9 wherein the hybrid hub is implemented in a personal computer wherein the bus is a high speed bus of the personal computer, each of said digital adapters and video compression/decompression and analog video network adapters are connected to the high speed bus of the personal computer, and said central processing unit and supporting memory are the central processing unit and memory of the personal computer.

15. The high performance hybrid digital/analog multimedia distribution network recited in claim 14 wherein said client terminals are workstations connected to said analog distribution network, said workstations being connected to said digital network via a digital path to transmit requests for video materials, including a specification of the material and any video processing to be performed, said requests for video materials being made by a user of a workstation through a keyboard of the workstation or via a pointing device at the workstation.

* * * * *